No. 12,314. REISSUED FEB. 7, 1905.
H. SIEGWART.
MANUFACTURE OF CONCRETE BEAMS, GIRDERS, &c., WITH IRON BARS INLAID, FOR BUILDING PURPOSES.
APPLICATION FILED SEPT. 21, 1904.
3 SHEETS—SHEET 1.
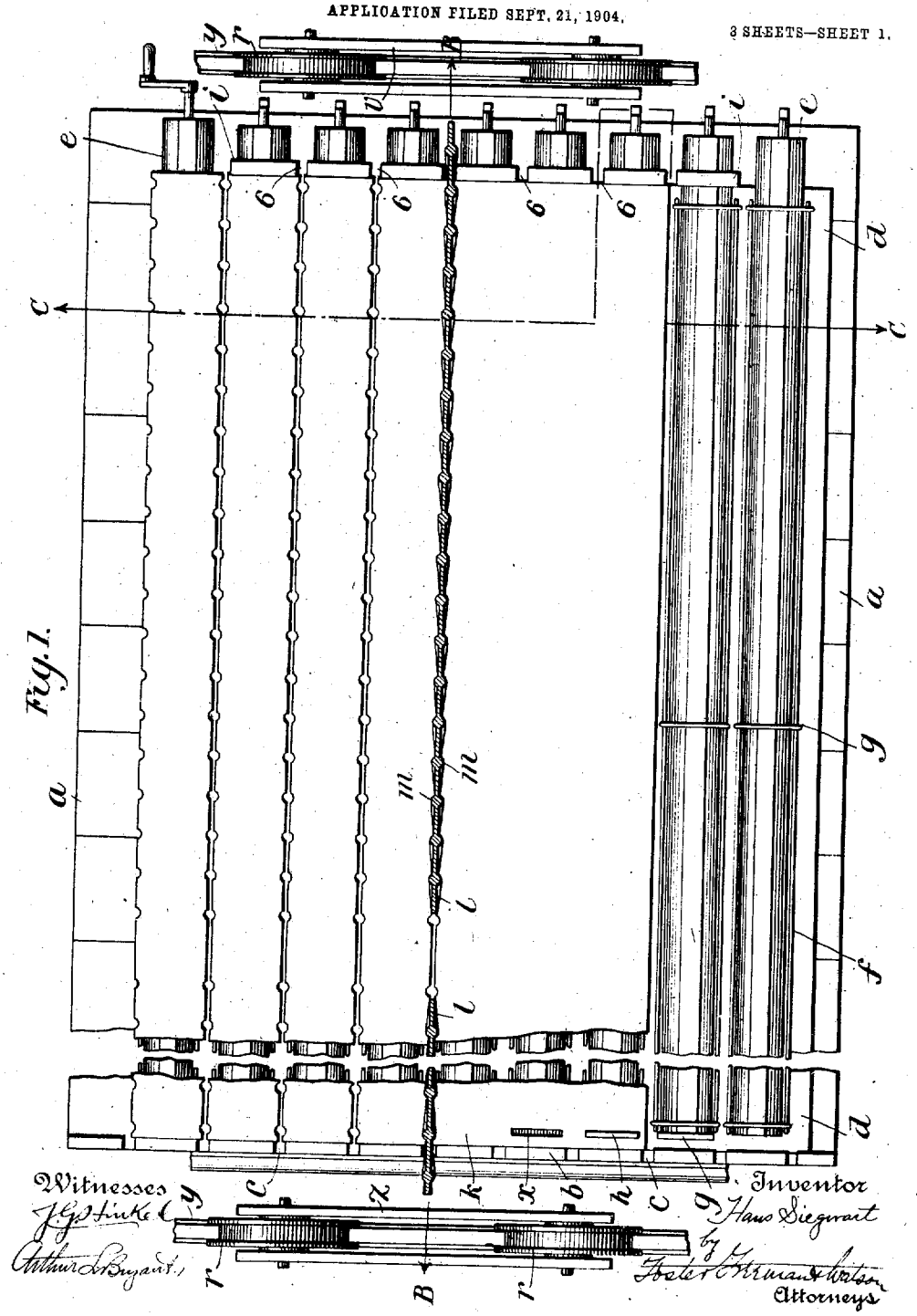

No. 12,314. REISSUED FEB. 7, 1905.
H. SIEGWART.
MANUFACTURE OF CONCRETE BEAMS, GIRDERS, &c., WITH IRON BARS INLAID, FOR BUILDING PURPOSES.
APPLICATION FILED SEPT. 21, 1904.
3 SHEETS—SHEET 2.
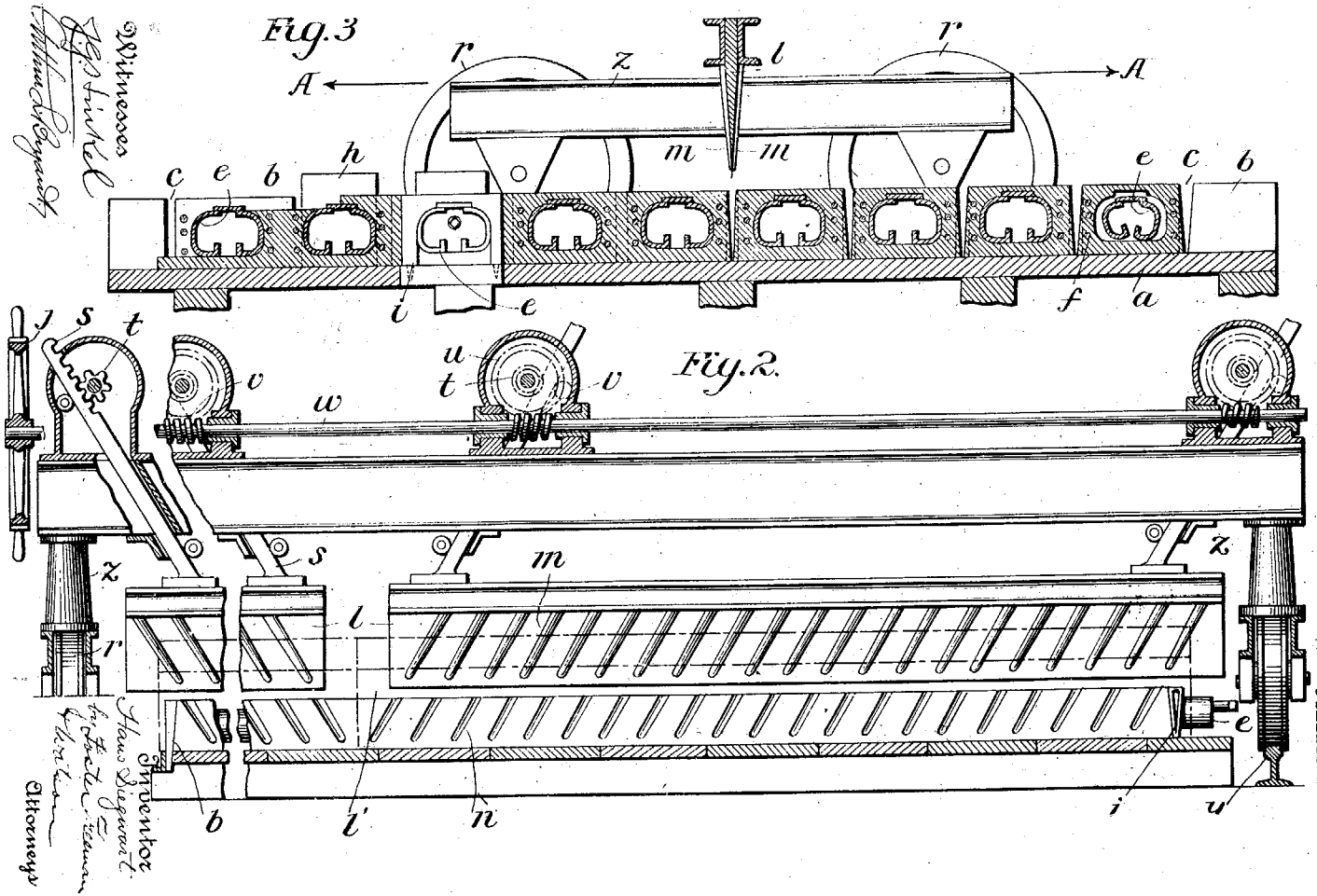

No. 12,314. REISSUED FEB. 7, 1905.

H. SIEGWART.

MANUFACTURE OF CONCRETE BEAMS, GIRDERS, &c., WITH IRON BARS INLAID, FOR BUILDING PURPOSES.

APPLICATION FILED SEPT. 21, 1904.

3 SHEETS—SHEET 3.

Witnesses
J. G. Finkel
Arthur L. Bryant

Inventor
Hans Siegwart
by Foster Freeman & Watson
Attorneys

No. 12,314. Reissued February 7, 1905.

UNITED STATES PATENT OFFICE.

HANS SIEGWART, OF LUCERNE, SWITZERLAND.

MANUFACTURE OF CONCRETE BEAMS, GIRDERS, &c., WITH IRON BARS INLAID, FOR BUILDING PURPOSES.

SPECIFICATION forming part of Reissued Letters Patent No. 12,314, dated February 7, 1905.

Original No. 720,747, dated February 17, 1903. Application for reissue filed September 21, 1904. Serial No. 225,426.

DIVISION A.

*To all whom it may concern:*

Be it known that I, HANS SIEGWART, architect, a citizen of the Republic of Switzerland, and a resident of Lucerne, Switzerland, have invented certain new and useful Improvements in the Manufacture of Concrete Beams, Girders, and the Like, with Iron Bars Inlaid, for Building Purposes; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to apparatus for the manufacture of hollow columns, beams, girders, and the like for building purposes from a plastic material. For this purpose I employ a core or mold capable of being collapsed after the column is molded and withdrawn from the interior of the column at one end. These columns are made from a single sheet, with the molds embedded therein and cut between the molds by suitable devices.

Figure 4:
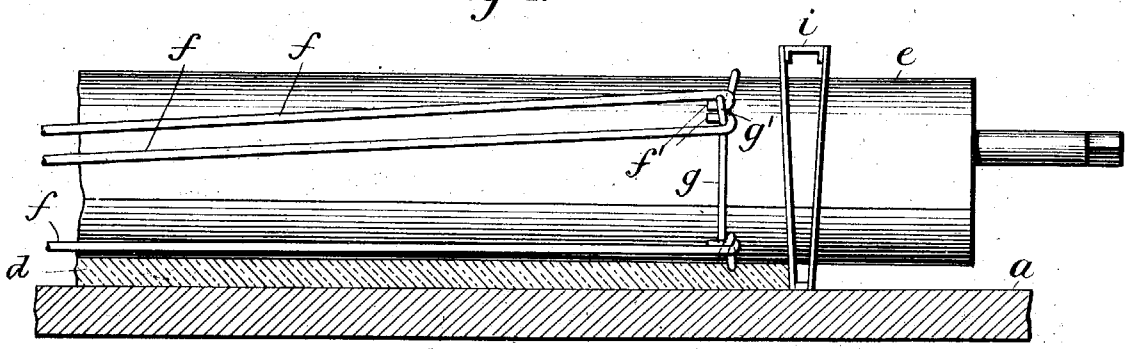
Figure 5:
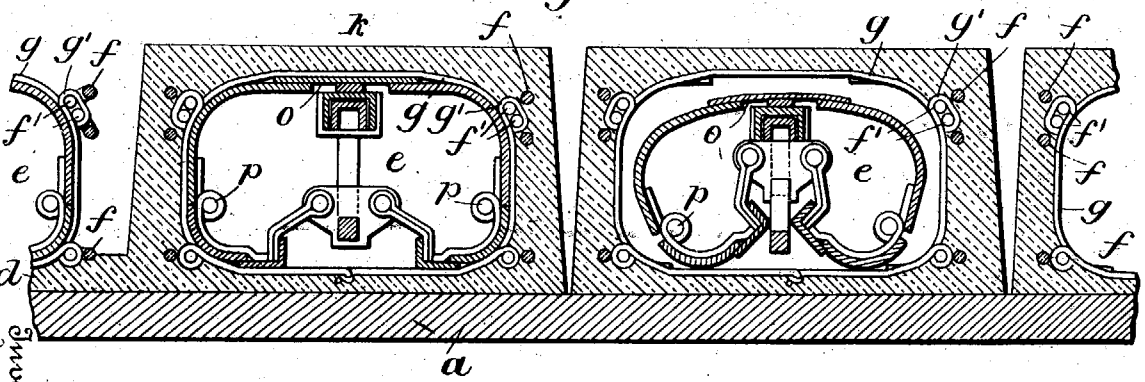

Referring to the drawings, in which like parts are similarly designated, Figure 1 is a top plan view, partly cut away, on the lines A A, Fig. 3. Fig 2 is a section on line B B, Fig. 1. Fig. 3 is a section on line C C, Fig. 1. Fig. 4 is a side view of a portion of the mold in position, and Fig. 5 is a transverse section showing the molds in relative position to the finished column.

A horizontal bed *a*, preferably though not neressarily made of wood, on which the columns are formed, has a vertical side wall *b*, which forms the end of the molded column. This side wall *b* is provided with vertical slots *c*, extending from its upper edge to the bed *a* and of a distance apart equal to the width of a column. A layer *d* of plastic material of which the columns are to be made, preferably of beton, concrete, or Portland cement, is placed upon the bed *a*, and upon this are laid the hollow cores *e*, capable of being contracted in cross-section. On the latter are supported at a suitable distance therefrom rods *f* to be embedded in the side walls of the hollow columns and mounted on the cores, so as to be suitably spaced around the columns at a suitable distance from the outer surfaces of the sides thereof. To this end spacing-wires *g* are employed, which are twisted or looped at *g'* around the ends *f'* of the rods *f*, which, as shown, are hooked. Each hollow mold, with the rods *f* secured thereto, is placed upon the sheet *d* of plastic material a slight distance from the end wall *b*, and the open end of said mold is closed by plate *h*. Over the opposite end of the hollow mold is placed a fork *i*, whose pointed or sharpened ends are driven into the bed. These forks are also distanced from one another, as shown at 6, and are the same distance apart as the vertical slots *c* in the wall *b*, and the distance between the fork *i* and the wall *b* is the length of the column to be made. After the cores have been placed parallel to each other in proper position upon the sheet of material *d* the spaces around them are filled in with beton or the like, which is solidly tamped, and then covered with a layer *k* of beton, so as to entirely inclose the cores. The space between the end wall *b* and the plates *h* is also filled with beton, after which these plates *h* are withdrawn, and the holes *x*, Fig. 1, that are left thereby, are also filled with beton. There will thus be formed a continuous sheet or mass containing a plurality of hollow parallel cores and capable of being cut into separate columns, and for this purpose I employ two knives *l* capable of moving toward one another and downward at the same time, so as to have a shearing action during the cutting.

The knives *l* are carried by a frame *z*, mounted on rollers *r* on a suitable track *y* parallel to the bed of the machine. These two knives are in the same cutting plane, and each knife is supported by inclined parallel racks *s*, engaging a pinion *t* on the worm-gear *u*. All of the worm-gears are operated by worms *v* on a single actuating-rod *w*, moved by the hand-wheel *j*. They are thus moved downward and toward each other through the material until the two knives abut, as clearly seen from the dotted lines, Fig. 2. The knives are well beveled and provided on both sides with ribs *m*, which are inclined and parallel to the direction of the motion of the knife, the object of these ribs being to form inclined grooves $n$ in the sides of the column without hindering the cutting action of the knives. The knives pass through the slots $c$ in the wall $b$ and at the same time between the forks $i$ at the opposite ends of the columns and not only act to cut the columns apart between the adjacent sets of rods, but at the same time compress the material sidewise.

In order to prevent the successive columns from being distorted during the cutting, each cut after being made is filled with fine sand, this filler preventing the column from yielding sidewise under the action of the tapering knife, and the retention of the cores within the comparatively soft mass during this action of the knife also prevents the fracture of the material, which is compressed between the sides of the knife and the cores within the cavities. After the mass has hardened the cores are removed. These cores $e$ are built up of several parts and comprise a spring top plate $o$ and pairs of side sections hinged at $p$. By this construction the collapsible cores can be altered in section and to any desired form, so that they can be readily withdrawn from the cavities in the mass.

The wires $g$, supporting the longitudinal rods $f$ on the hollow cores, are of course left in the columns after withdrawing the cores and serve to strengthen each column on each side thereof, the hooks serving as heads to anchor the ends of the rods and preventing the latter from slipping longitudinally under tension.

By forming each column with a solid end the columns are adapted to better resist the vertical pressures, and in laying floors the columns are alternately reversed end for end, so that the solid end of one column is opposite the open end of the next column, a solid support for walls, &c., being thus secured at each end of the floor. With this reversed position also the reversely-inclined grooves of one column coincide with those at the side of the next column, so that the cement which is introduced between the sides of the columns after they are laid when it hardens will better support the columns against vertical pressure than if the grooves were all in the same direction.

I do not here claim the column itself, as this constitutes the subject-matter of a separate application for Letters Patent, Serial No. 225,427.

Having thus described my invention, what I claim as new therein, and desire to secure by Letters Patent, is—

1. In the production of columns of plastic material, first forming a continuous bed of said material about a series of parallel cores, cutting the bed between the cores, depositing a filler in each cut after it is made, and removing the cores, substantially as set forth.

2. In the production of columns of plastic material, first forming a bed of said material about a series of parallel cores arranged to leave a portion of the material between one end of each core and the side of the mass, dividing the mass between the cores and thereafter removing the latter, substantially as set forth.

3. The method of forming columns, which consists in first forming a bed of plastic material having cavities therein, embedding in the material rods at the sides of the cavities, and then cutting the material into strips between the adjacent sets of rods, substantially as and for the purpose set forth.

4. In the production of columns of plastic material, first forming a bed of the said material with a plurality of parallel cavities, and dividing the bed, while the material is soft, between the cavities and while the bed is supported from within the cavities, substantially as set forth.

5. In the production of columns of plastic material, first forming a bed of said material about a series of parallel cores, and while the material is soft, dividing the mass between the cores, and removing the cores after the mass is hardened, substantially as set forth.

6. The method of producing columns of plastic material consisting in forming a bed of such material with parallel cavities therein, dividing the material before hardening between the cavities, and while the material is supported from within the cavities, and simultaneously compressing it laterally against the supports, substantially as set forth.

7. In the production of columns of plastic material, forming a bed of such material with parallel cavities of a size to produce a plurality of columns, dividing it in the sections between the cavities, and simultaneously producing recesses in the faces formed in making the divisions, substantially as set forth.

8. In the production of columns of plastic material, depositing a mass of said material about the series of cores, each having rods supported at a distance therefrom, cutting the material between the different sets of rods while it is soft, and thereafter withdrawing the cores, substantially as set forth.

In testimony whereof I have signed my name to this specification in the presence of two subscribed witnesses.

HANS SIEGWART.

Witnesses:
S. SCHUMACHER,
CARL FROSTBURG.